United States Patent
Lee (10) Patent No.: US 10,334,019 B2
(45) Date of Patent: Jun. 25, 2019

(54) METHOD AND ASSOCIATED SERVER FOR ENSURING DATA SECURITY UNDER HIGH ACCESS EFFICIENCY

(71) Applicant: Synology Incorporated, Taipei (TW)

(72) Inventor: Yi-Chien Lee, Taipei (TW)

(73) Assignee: SYNOLOGY INCORPORATED, Taipei (TW)

( * ) Notice: Subject to any disclaimer, the term of this patent is extended or adjusted under 35 U.S.C. 154(b) by 218 days.

(21) Appl. No.: 15/287,728

(22) Filed: Oct. 6, 2016

(65) Prior Publication Data

US 2017/0257419 A1    Sep. 7, 2017

(30) Foreign Application Priority Data

Mar. 4, 2016 (TW) .............................. 105106689 A (51) Int. Cl.
  *G06F 21/62* (2013.01)
  *H04L 29/06* (2006.01)
  *H04L 29/08* (2006.01)

(52) U.S. Cl.
  CPC .......... *H04L 67/06* (2013.01); *G06F 21/6218* (2013.01); *H04L 63/10* (2013.01); *H04L 67/02* (2013.01); *H04L 67/1097* (2013.01); *H04L 67/34* (2013.01); *H04L 63/105* (2013.01); *H04L 63/168* (2013.01)

(58) Field of Classification Search
  CPC ......... H04L 67/06; H04L 67/02; H04L 67/34; H04L 67/1097
  See application file for complete search history.

(56) References Cited

U.S. PATENT DOCUMENTS

| | | | | |
|---|---|---|---|---|
| 7,272,628 | B1* | 9/2007 | Pravetz | H04L 63/10 709/203 |
| 2006/0259549 | A1* | 11/2006 | Huang | G06K 15/00 709/203 |

FOREIGN PATENT DOCUMENTS

| | | |
|---|---|---|
| TW | 535081 | 6/2003 |
| TW | 200941233 | 10/2009 |
| TW | 201314571 A1 | 4/2013 |

OTHER PUBLICATIONS

Nils Maier, mod_xsendfile for Apache2/Apache2.2, XP055365356, Mar. 16, 2015, pp. 1-9, URL:https://web.archive.org/web/20150316082444/https://tn123.org/mod_xsendfile/.
N.A., Secure download using X-Accel-Redirect, XP055364890, Jan. 7, 2016, pp. 1-3, URL:http://arquivo.pt/wayback/20160107230040/http://pyrox.eu/en/documentation/secure-downloads-using-x-accel-redirect/.

(Continued)

*Primary Examiner* — El Hadji M Sall
(74) *Attorney, Agent, or Firm* — McClure, Qualey & Rodack, LLP (57) ABSTRACT

A server includes a HTTP module and a CGI module, where the HTTP module includes a configuration file, and the configuration file describes an application that has an authority to access files stored in the server. In the operations of the server, the HTTP module receives a request delivered from a device external to the server, and sends the request to the CGI module to determine whether the request has the authority or not, and the CGI module transmits the determination result to the HTTP module. If the request has the authority and the request satisfies the application described in the configuration file, the HTTP module reads and sends back the file corresponding to the request.

15 Claims, 5 Drawing Sheets

(56) References Cited

OTHER PUBLICATIONS

Anonymous, python—Django—Understanding X-Sendfile—Stack Overflow, XP055365347, Nov. 14, 2015, pp. 1-2, URL:https/web.archive.org/web/20151114174006/http://stackoverflow.com/questions/7296642/django-understanding-x-sendfile.

Oleksiy Kovyrin, Using X-Accel-Redirect in Nginx to Implement Controlled Downloads, XP055365337, Nov. 1, 2006, pp. 1-3, URL:http://web.archive.org/web/20150409053740/http://kovyrin.net:80/2006/11/01/nginx-x-accel-redirect-php-rails/.

* cited by examiner

METHOD AND ASSOCIATED SERVER FOR ENSURING DATA SECURITY UNDER HIGH ACCESS EFFICIENCY

BACKGROUND OF THE INVENTION

1. Field of the Invention

The present invention relates to a server, and more particularly, to a web server and an associated method of executing a request.

2. Description of the Related Art

When a related art web server receives a request delivered from a user, the server will refer to the user identity (ID) and/or the contents requested to be accessed (e.g. reading a web page (*.html) or executing a web page program (*.php)), in order to select a worker identity having a different execution authority. Different worker identities may have problems communicating with each other, however, resulting in increasing complexity when designing web page programs.

SUMMARY OF THE INVENTION

Hence, an objective of the present invention is to provide a web server, in which an HTTP module thereof only uses one worker identity to execute a request. In addition, the worker identity has a high access authority so it can access any required file content. An embodiment of the present invention further provides a safety module to limit the access rage of requests, in order to provide high access efficiency without sacrificing data safety.

According to an embodiment the present invention, a server is provided. The server includes an HTTP module and a common gateway interface (CGI) module. The HTTP module includes a configuration file, in which the configuration file describes an application that has an authority to access files stored in the server. The HTTP module is arranged to receive a request delivered from a device external to the server, and sends the request to the CGI module to determine whether the request has an execution authority. The CGI module is arranged to transmit a determination result to the HTTP module. If the request has the authority and the request satisfies the application described in the configuration file, the HTTP module reads and sends back a file corresponding to the request.

According to another embodiment of the present invention, a method of executing a request is provided. The method comprises: utilizing an HTTP module to receive a request, and sending the request to a common gateway interface (CGI) module; utilizing the common gateway interface module to determine whether the request has an execution authority; sending back a determining result of the common gateway interface module to the HTTP module; utilizing the HTTP module to determine whether applications corresponding to the request satisfy contents of a configuration file; and if the request has the execution authority, and the applications corresponding to the request satisfy the contents of the configuration file, utilizing the HTTP module to read and send back files demanded by the request.

According to yet another embodiment of the present invention, a server is provided. The server includes an HTTP module. The HTTP module is arranged to receive a request external to the server, and refer to applications corresponding to the request to determine whether the request has an authority of downloading files, in which if the request has the authority of downloading files, the HTTP module resets a file path to read and send back the file; and if the request does not have the authority of downloading files, the HTTP module sends backs a read failure message and does not set the file path as a correct file path.

According to still another embodiment of the present invention, a method of executing a request is provided. The method includes: receiving a request external to a server; determining whether an application corresponding to the request has an authority of downloading files; if it is determined that the request has the authority of downloading files, resetting a file path in order to read and send back the file; and if the request does not have the authority of downloading files, not setting the file path as a correct file path, and sending back a read failure message.

These and other objectives of the present invention will no doubt become obvious to those of ordinary skill in the art after reading the following detailed description of the embodiments illustrated in the various figures and drawings.

DETAILED DESCRIPTION

Figure 1:
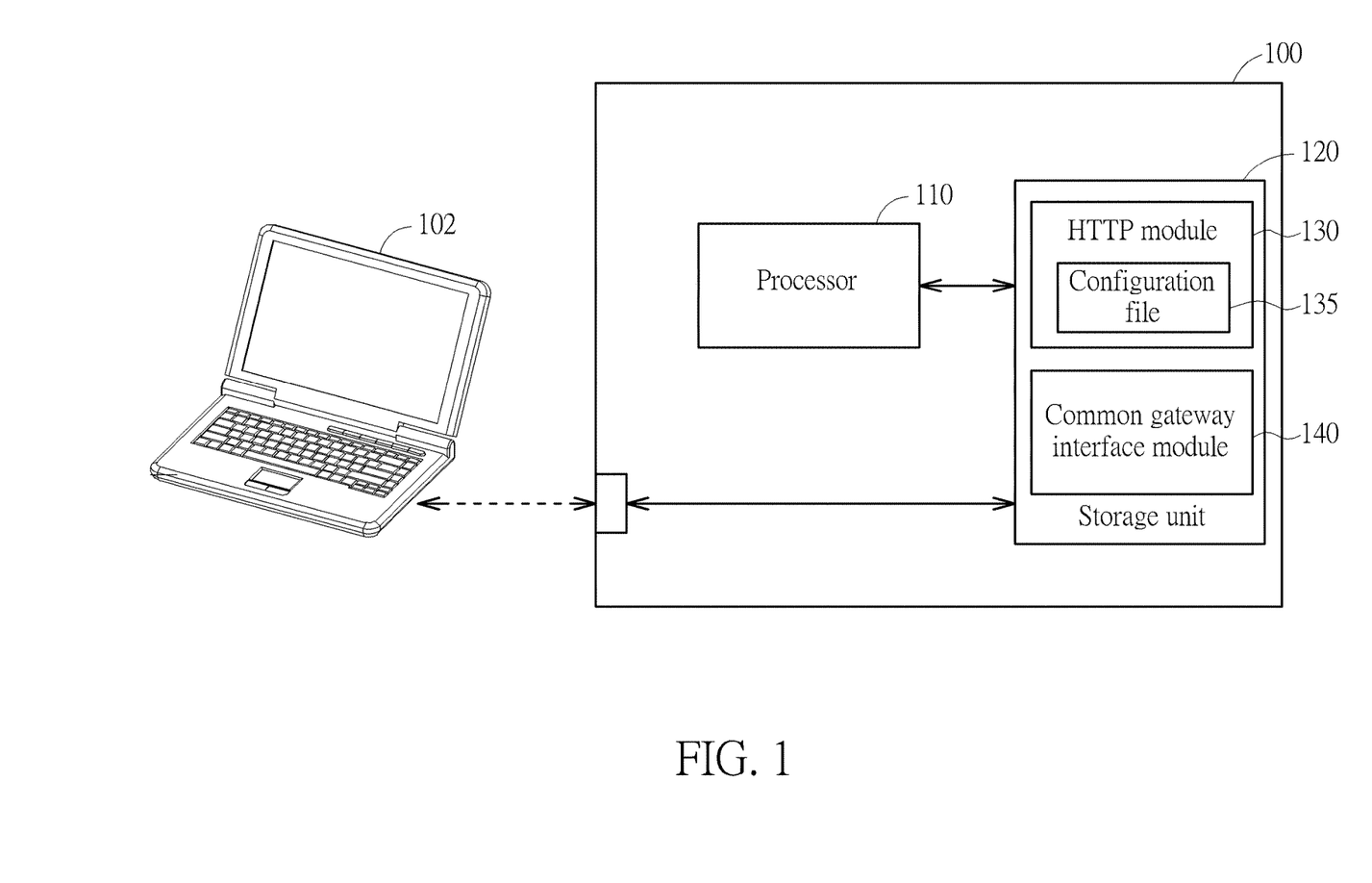
FIG. 1 is a diagram illustrating a server according to an embodiment of the present invention.

Refer to FIG. 1, which is a diagram illustrating a server 100 according to an embodiment of the present invention. As shown in FIG. 1, the server 100 at least includes a processor 110 and a storage unit 120, in which the storage unit 120 includes an HTTP module 130 and a common gateway interface (CGI) module 140. In this embodiment, the server 100 is a multifunctional network-attached storage server, which includes functions of a web server. The server 100 may determine a request of the electronic device 102 of the client received by the HTTP module 130, in order to access the static state web page data or the web page program, For example, the server 100 may determine a uniform resource locator (URL) from the client received by the HTTP module 130. The server 100 is arranged to receive a HyperText Transfer Protocol (HTTP) request from the client, and process the HTTP in order to provide an HTTP response to the client. The present invention is not limited thereto. The server 100 may further include other functions of a server.

In practice, the HTTP module 130 and the common gateway interface module 140 can be executed in the software manner. For example, the processor 110 executes one or more program codes in the storage unit 120, and performs operations of the HTTP module 130 and the common gateway interface module 140.

When the HTTP module 130 executes the request from the client, the HTTP module 130 will assign at least one worker to execute the operation request. In this embodiment, the HTTP module 130 is implemented with the Nginx web server, and all workers in the HTTP module 130 have the same authority (e.g. the same worker identity). Specifically, there are two execution modes related to the worker in the Nginx web server, i.e. the master process and the worker process. The master process is arranged to monitor the state and the amount of worker processes, and the master process may create multiple workers having the same authority when the server 100 boots up. These worker can execute all external requests. Furthermore, the HTTP module 130 uses settings that adopt Linux capability to allow all workers to have a highest authority. Specifically, the HTTP module 130 may set the command CAP_DAC_READ_SEARCH or CAP_DAC_OVERRIDE in the Linux system to have the highest reading ability, in order to allow the HTTP module 130 to read the contents of any file without being limited by authority checks of other conventional Unix systems.

All workers of the HTTP module 130 are set to be capable of reading any file in the server 100, in order to prevent the user from accessing file contents that should not be read, such as system program files. In this embodiment, the HTTP module 130 further includes a configuration file (e.g. the configuration file 135 shown in FIG. 1) that describes an application having the authority to access files in the server. The configuration file sets which applications are allowed to access the needed files, in order to limit the access range of the user, in which this configuration file may perform settings when the server 100 installs the operating system, or at another appropriate timing. The server 100 further utilizes the common gateway interface module 140 to examine whether the user ID is allowed to access files, in order to ensure the safety of data in the server 100.

Figure 2:
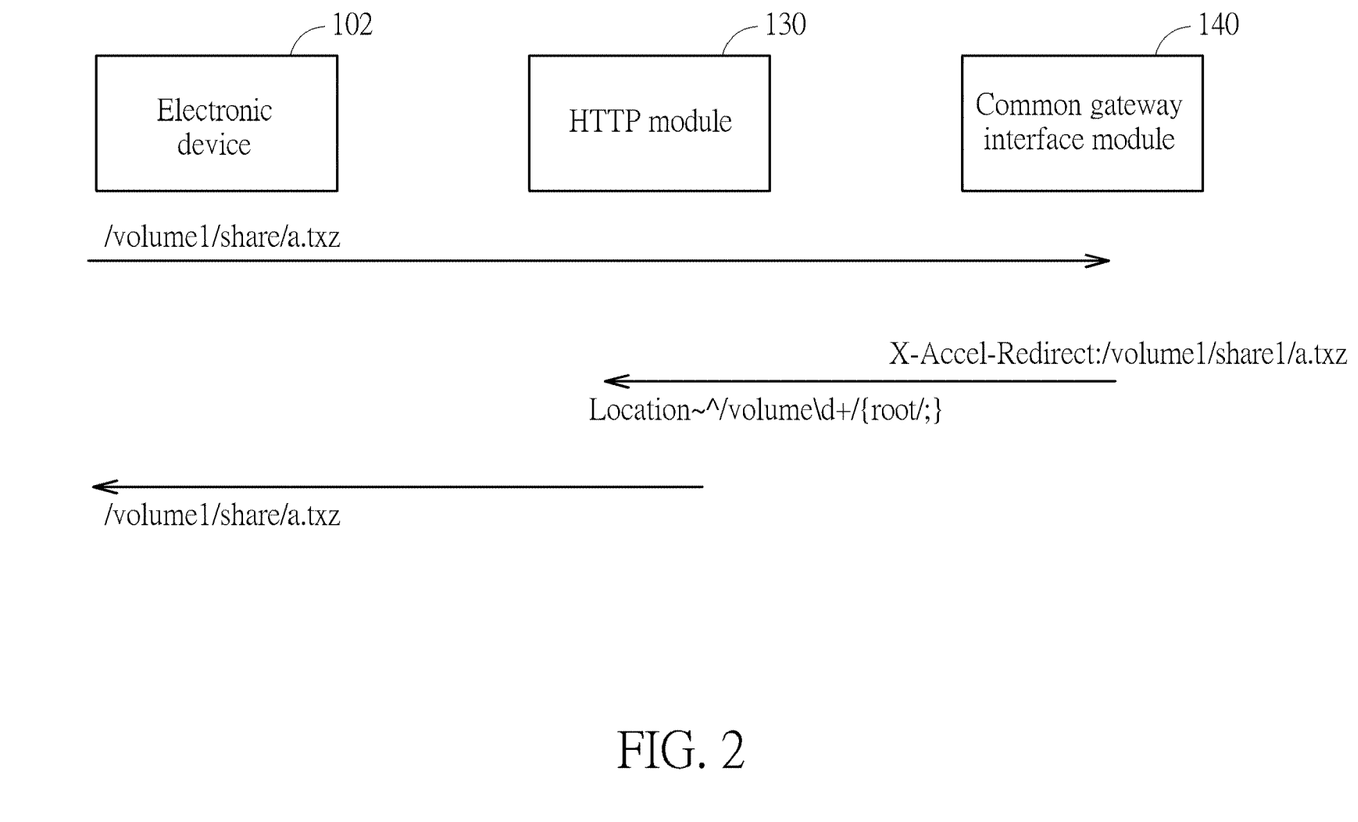
FIG. 2 is a diagram illustrating a server executing a request delivered from an electronic device according to an embodiment of the present invention.

Refer to FIG. 2, which is a diagram illustrating the server 100 executing a request delivered from an electronic device 102 according to an embodiment of the present invention. As shown in FIG. 2, when the user needs to download a file from the server 100, the electronic device 102 will transmit a request to the server 100. In this embodiment, the request is a uniform resource locator (URL) or an associated file path "/volume1/share/a.txz". The HTTP module 130 receives the request and then transmits the request to the common gateway interface module 140, or processes the request and then transmits the request to the common gateway interface module 140. After the common gateway interface module 140 receives the request, the common gateway interface module 140 will determine whether the request has the authority of executing, in order to generate a determining result in advance. More specifically, since the user will log in using his ID (e.g. the user account) when connecting to the server 100 through the electronic device 102, the common gateway interface module 140 may determine a user ID and a file path of the request to determine whether the request has the execution authority. After the execution authority of the request is confirmed, the common gateway interface module 140 will transmit the determining result to the HTTP module 130, and simultaneously send back a file path of the file to be downloaded to the HTTP module 130. In this embodiment, the common gateway interface module 140 uses an X-Accel mechanism of the Nginx web server to transmit the file path "/volume1/share1/a.txz" to the HTTP module 130.

After the HTTP module 130 receives the determining result and file path from the common gateway interface module 140, the HTTP module 130 will refer to whether the request has the execution authority and satisfies the applications described in the configuration file, in order to determine whether the received file path should be reset as a correct file path. Specifically, assuming that the configuration file in the HTTP module 130 describes that the file station and audio station are downloadable, when the request belongs to the file station or audio station, the HTTP module 130 will reset the received file path "/volume1/share1/a.txz" as the correct file path, e.g. adding "^\volume\d+/" in front of the received file path in order to generate the correct file path. Then, the HTTP module 130 may obtain files from the server 100 according to this correct file path, and send back the read files to the electronic device 102.

Figure 3:
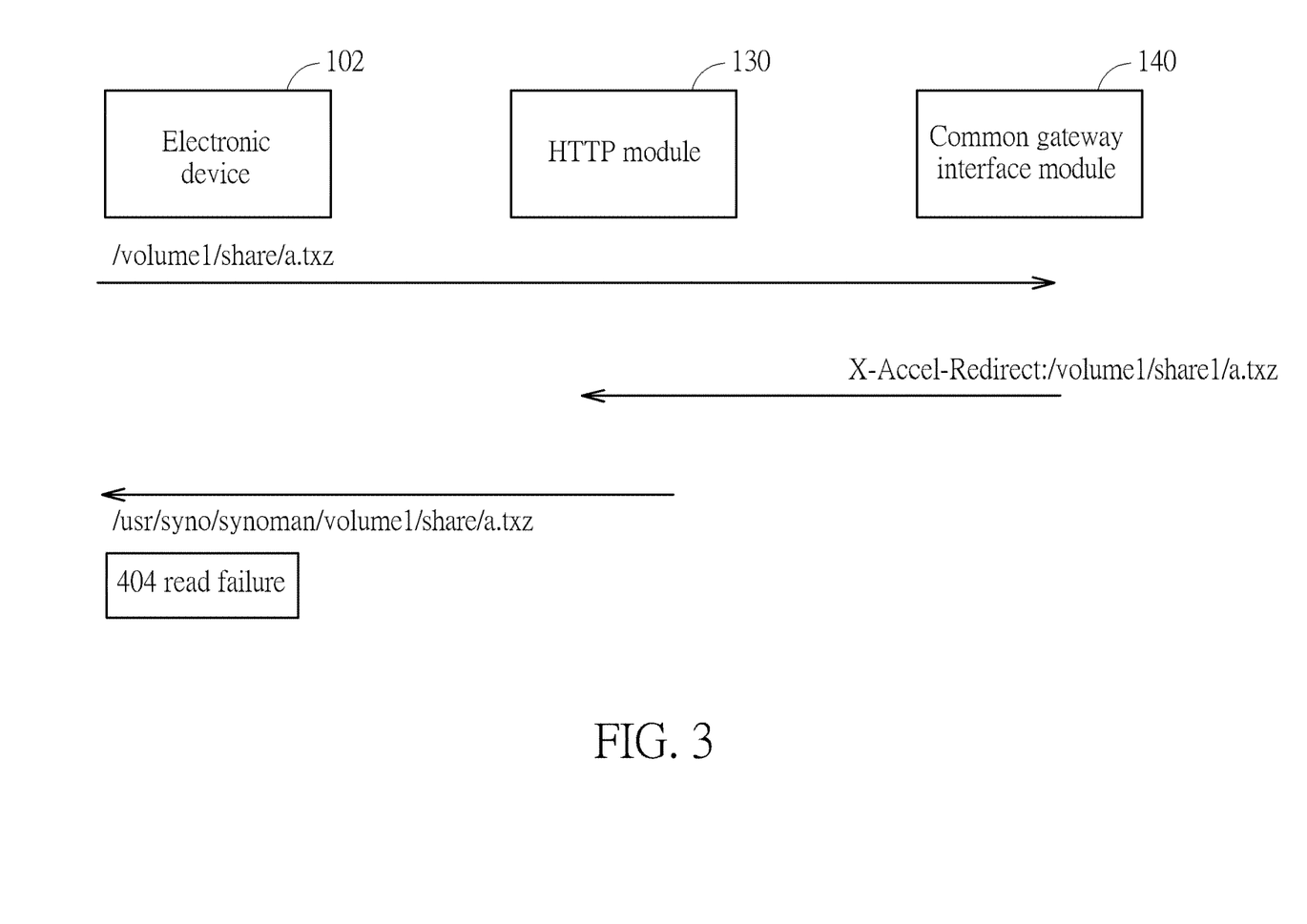
FIG. 3 is a diagram illustrating a server executing a request delivered from an electronic device according to another embodiment of the present invention.

Assuming that the request does not belong to the file station or audio station, i.e. the application to which the request belongs is not described in the configuration file of the HTTP module 130, the HTTP module 130 will not reset the received file path as the correct file path. In the example of FIG. 3, if the application belongs to the request that is not described in the configuration file of the HTTP module 130, the HTTP module 130 will convert the received file path "/volume1/share1/a.txz" into an incorrect file path "/usr/syno/synoman/volume1/share1/a.txz", making the HTTP module 130 unable to correctly read the target files.

In the above embodiments, all accesses related to files are performed by the HTTP module 130. The common gateway interface module 140 only transmits the file path to the HTTP module 130, without performing file accesses for the request, thus reducing the operation loadings of the server 100. Further, when the file requested by the request is a static state file, the method may have better access efficiency.

Figure 4:
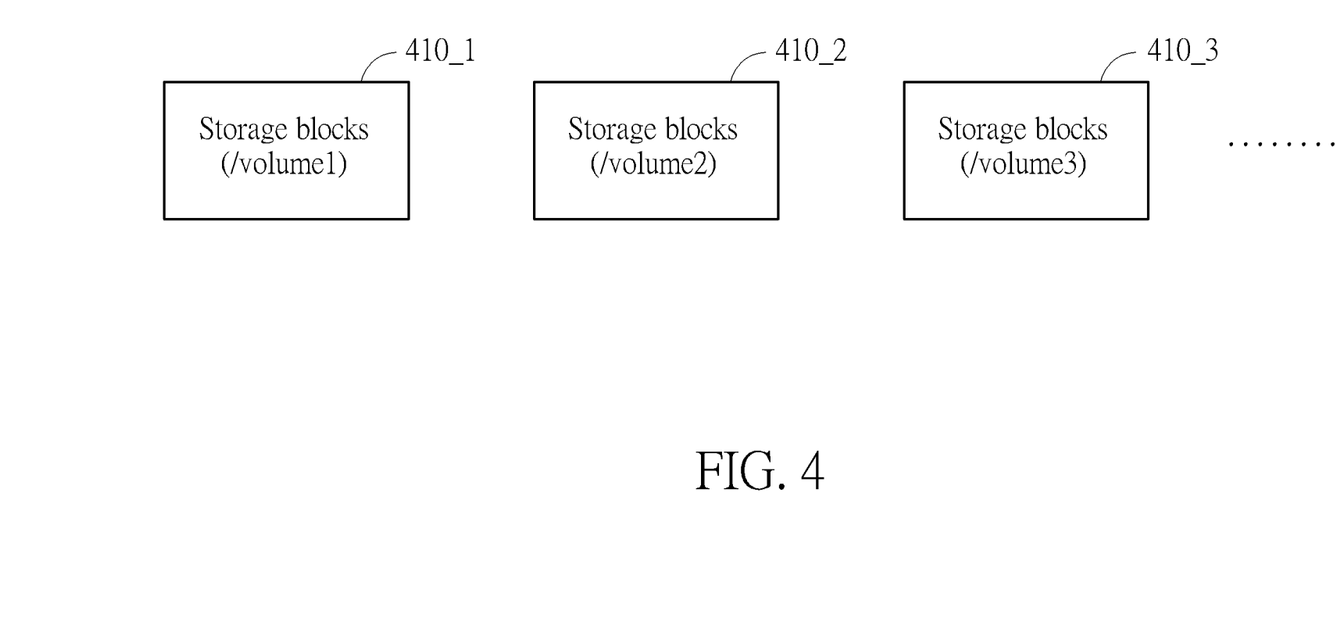
FIG. 4 is a diagram illustrating a plurality of storage blocks corresponding to different applications.

The methods of using a converting path to limit the file access shown in FIGS. 2 and 3 may be viewed as methods of protecting the security of the user space. In another embodiment of the present invention, a kernel space protecting method can be further utilized to improve the security. Refer to FIG. 4, which is a diagram illustrating a plurality of storage blocks 410_1-410_3 corresponding to different applications, in which the storage blocks 410_1-410_3 can be installed in any storage device in the storage unit 120 or the server 100, and each of the storage blocks 410_1-410_3 has its own access index, such as "/volume1", "/volume2" and "/volume3" as labeled in FIG. 4. Each of the storage blocks 410_1-410_3 can only be accessed by the requests corresponding to specific applications. For example, assuming that the storage block 410_1 is a file data for storing a file station, when the user transmits the request through the electronic device 102 and the file station, the file path generated by the HTTP module 130 and the common gateway interface module 140 will be connected to the storage block 410_1 only without connecting to other storage blocks, in order to prevent reading any file not suitable to be read, such as system password files and sensitive system information. In another example, assuming that the storage block 410_2 is arranged to store file data of an audio station, when the user sends the request through the electronic device 102 and the audio station, the file path generated by the HTTP module 130 and the common gateway interface module 140 will be connected to the storage block 410_2 only without connecting to other storage blocks. In this embodiment, the aforementioned method for protecting the kernel space may be implemented with the AppArmor of the Linux Security Module (LSM).

Figure 5:
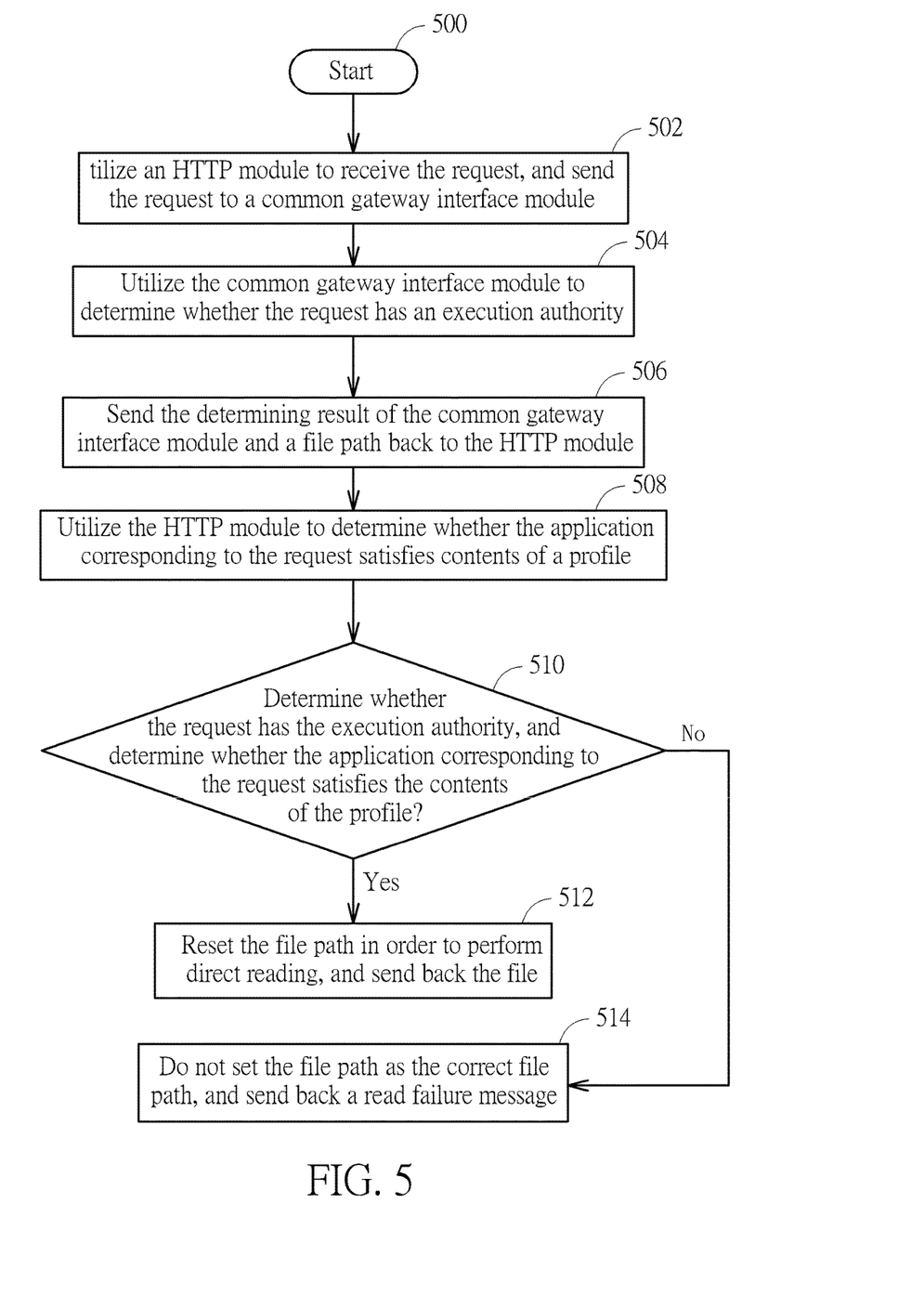
FIG. 5 is a flowchart illustrating a method for executing a request according to an embodiment of the present invention.

FIG. 5 is a flowchart illustrating a method for executing a request according to an embodiment of the present invention. The detailed description thereof is as follows.

Step 500: Start.
Step 502: Utilize an HTTP module to receive the request, and send the request to a common gateway interface module.
Step 504: Utilize the common gateway interface module to determine whether the request has an execution authority.

Step 506: Send the determining result of the common gateway interface module and a file path back to the HTTP module.
Step 508: Utilize the HTTP module to determine whether the application corresponding to the request satisfies contents of a configuration file.
Step 510: Determine whether the request has the execution authority according to the determining result of the common gateway interface module, and determine whether the application corresponding to the request satisfies the contents of the configuration file. If yes, go to Step 512; otherwise, go to Step 514.
Step 512: Reset the file path in order to perform direct reading, and send back the file.
Step 514: Do not set the file path as the correct file path, and send back a read failure message.

To summarize, the HTTP module in the server of the present invention only utilizes one worker identity to execute a request. In addition, in order to access needed file contents, the worker identity will have a high authority. To prevent security problems caused by a high access authority, an embodiment of the present invention provides respective security modules for the kernel space and the user space, in order to limit the access range of the request, thus ensuring the data security under high access efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server, comprising:
an HTTP module, comprising a configuration file, wherein the configuration file associated with a single worker identity that describes an application that has a high-access authority to access files stored in the server; and a common gateway interface (CGI) module;
wherein the HTTP module is arranged to receive a request delivered from a device external to the server and sends the request to the CGI module to determine whether the request has execution authority, and the CGI module transmits a determination result to the HTTP module, wherein when the request has the authority and the request satisfies the application described in the configuration file, the HTTP module reads and sends back a file corresponding to the request.

2. The server of claim 1, wherein the common gateway interface module determines whether the request has the authority by determining user identity and a file path of the request.

3. The server of claim 2, wherein the common gateway interface module utilizes an X-Accel mechanism to send back the file path to the HTTP module, and when the request has the authority and the request satisfies the applications described in the configuration file, the HTTP module resets the file path in order to read and send back the file.

4. The server of claim 3, wherein when the request does not have the authority, or the request does not satisfy the applications described in the configuration file, the HTTP module sends back a read failure message and does not set the file path as a correct file path.

5. The server of claim 1, wherein the HTTP module comprises a reading ability setting that allows each worker of a plurality of workers in the HTTP module to read any file corresponding to the applications.

6. The server of claim 5, wherein each of the workers in the HTTP module has a same authority.

7. The server of claim 5, wherein the reading ability setting is a CAP_DAC_READ_SEARCH or CAP_DAC_OVERRIDE command in the Linux system.

8. The server of claim 5, wherein the server further comprises a storage unit, files corresponding to the applications are stored in different storage blocks of the storage unit, and the HTTP module only accesses storage block contents corresponding to applications corresponding to the request.

9. The server of claim 1, wherein the common gateway interface module does not perform file access operations according to the request.

10. A method of executing a request, comprising:
utilizing an HTTP module to receive a request, and sending the request to a common gateway interface (CGI) module;
utilizing the common gateway interface module to determine whether the request has an execution authority;
sending back a determining result of the common gateway interface module to the HTTP module;
utilizing the HTTP module to determine whether applications corresponding to the request satisfy contents of a configuration file associated with a single worker identity that describes an application that has a high-access authority; and
when the request has the execution authority, and the applications corresponding to the request satisfy the contents of the configuration file, utilizing the HTTP module to read and send back files demanded by the request.

11. The method of claim 10, wherein the step of utilizing the common gateway interface module to determine whether the request has the execution authority comprises:
utilizing the common gateway interface module to determine a user identity and a file path of the request, in order to determine whether the request has the execution authority.

12. The method of claim 11, further comprising:
utilizing the common gateway interface module to send back the file path to the HTTP module with an X-Accel mechanism; and wherein the step of utilizing the HTTP module to read and send back the files demanded by the request comprises:
when the request has the execution authority and the request satisfies the applications described in the configuration file, the HTTP module resets the file path to directly read and send back the file.

13. The method of claim 12, wherein the step of utilizing the HTTP module to read and send back the files demanded by the request comprises:
when the request does not have the execution authority, or the request does not satisfy the applications described in the configuration file, the HTTP module send backs a read failure message and does not set the file path as a correct file path.

14. The method of claim 10, wherein the HTTP module comprises a reading ability setting, and the reading ability setting allows each worker of a plurality of workers in the HTTP module to read files corresponding to the applications.

15. The method of claim 14, wherein the method is applied to a server comprising a storage unit, the files corresponding to the applications are stored in different storage blocks of the storage unit, and the HTTP module only accesses storage block contents corresponding to applications corresponding to the request.

* * * * *